United States Patent [19]

Mannino

[11] Patent Number: 5,172,926
[45] Date of Patent: Dec. 22, 1992

[54] PEDAL DRIVE MECHANISM

[76] Inventor: Paul V. Mannino, 144 Barbara Dr., North Plainfield, N.J. 07062

[21] Appl. No.: 623,016

[22] Filed: Dec. 6, 1990

[51] Int. Cl.$^5$ .................... B62M-1/00; B62M 5/00
[52] U.S. Cl. ................................ 280/252; 280/256
[58] Field of Search ............ 74/594.3; 280/252, 256, 280/257, 259, 260, 261

[56] References Cited

U.S. PATENT DOCUMENTS

| | | | |
|---|---|---|---|
| 550,206 | 11/1895 | Tompkins | 74/594.3 |
| 595,535 | 12/1897 | Edwards | 74/594.3 |
| 597,098 | 1/1898 | Bullis | 74/594.3 |
| 613,456 | 11/1898 | Meier | 74/594.3 |
| 631,276 | 8/1899 | Bulova | 74/594.3 |
| 653,873 | 7/1900 | Malone | 74/594.3 |
| 702,804 | 6/1902 | Lilburn | 280/215 |
| 1,323,004 | 11/1919 | Boyd | 74/594.3 |
| 1,977,236 | 10/1934 | Lofquist et al. | 74/594.3 |
| 2,184,049 | 12/1939 | Lienhard | 74/594.3 |
| 2,316,530 | 4/1943 | Nilsen | 74/594.3 |
| 3,888,136 | 6/1975 | Lapeyre | 74/594.1 |
| 4,019,230 | 4/1977 | Pollard | 280/259 X |
| 4,266,794 | 5/1981 | Bals | 280/227 |
| 4,446,754 | 5/1984 | Chattin | 74/594.3 |
| 4,519,271 | 5/1985 | Chattin | 74/594.3 |
| 4,577,879 | 3/1986 | Vereyken | 280/256 |
| 4,606,241 | 8/1986 | Fredriksson | 74/594.1 |
| 4,872,695 | 10/1989 | Silvano et al. | 280/257 |

FOREIGN PATENT DOCUMENTS 9068 3/1900 Norway ........................ 280/252

Primary Examiner—Margaret A. Focarino
Assistant Examiner—Kevin Hurley
Attorney, Agent, or Firm—Lerner, David, Littenberg, Krumholz & Mentlik

[57] ABSTRACT

A drive mechanism and a bicycle having a drive mechanism is disclosed, the drive mechanism increasing the torque resulting from a force applied to the pedals and providing for more efficient transmission of such force to propel the bicycle or other vehicles or device. The drive mechanism includes a drive sprocket rotatably mounted to the bicycle frame, a pair of opposing pedal cranks, a pair of lever arms, each lever arm being rotatably secured to one of the opposing cranks such that there is a distance between the point of connection and the pedal, a pair of guide members, each of which are pivotally connected to the respective lever arms remote from the respective pedals and being pivotally connected to the bicycle frame such that the guide members can limit movement of the respective lever arms, and thereby provide a more efficient path of movement for the pedals. The guide members are connected to the respective lever arms at angles thereto, and the lever arms, at the point of pivotal connection to the guide members, always remain below the axis of the drive wheel.

33 Claims, 4 Drawing Sheets

PEDAL DRIVE MECHANISM

BACKGROUND OF THE INVENTION

The present invention relates generally to drive mechanisms for bicycles of all types, including stationary exercise bicycles, and any other devices or machinery, whether manually or otherwise driven. More particularly, the present invention relates to a pedal operated drive mechanism which facilitates a more efficient transmission of force than conventional drive mechanisms.

The operation of bicycles and other pedal operated vehicles or devices are typically propelled by a conventional drive mechanism which employs a drive sprocket, a gear and a drive chain operatively associated with the drive sprocket and gear to transmit the manual force applied to a set of pedals connected to the drive sprocket, thus enabling the bicycle or other vehicle to move, or to otherwise power a device, by overcoming frictional or other resistive forces. Conventional drive mechanisms are manifest in other forms, though most such conventional drive mechanisms share the same disadvantages, including inefficient transmission of the manual force and/or the inefficient production of such manual force. With respect to the latter, the typical drive mechanism on a bicycle or other similarly operated vehicle provides for a pedal path which is circular, tracking the crank circle. The result is a pedal system which has a power stroke which is equal to or shorter than the return stroke. Moreover, as opposing pedal cranks are displaced from one another by 180°, every 360° rotation of the drive sprocket includes two "dead spots" at which the pedal cranks are simultaneously in the vertical position. As can be appreciated, no productive force can be applied to the pedals when the pedal cranks are in such vertical positions. In addition to generally providing an inefficient path of movement for the pedals, the typical drive mechanism permits the production of only a limited degree of torque and/or power as the sizes of the pedal crank, drive sprocket and other components must be limited to accommodate design specifications. For instance, on a bicycle, it is desirable to position the seat of a bicycle as close to the ground as possible given the height of the individual for whom the bicycle is designed. Thus, as the drive sprocket is located substantially directly beneath the seat, the length of such persons legs require that the drive sprocket be even closer to the ground. As a consequence, the length of the pedal crank must be limited so that the ground does not interfere with the movement of the pedals at the bottom of the power stroke.

The above disadvantages and shortcomings have been broadly recognized by those in the bicycle and related industries, and attempts have been made to alleviate the same. For instance, U.S. Pat. No. 2,184,049 to Lienhard discloses a pedal drive for a bicycle which provides a return stroke which is shorter than the power stroke. However, this is only accomplished by the use of a dual sprocket drive system arranged in conjunction with a complicated array of levers and cranks. Thus, each drive sprocket includes a crank, or more particularly a driving crank and a pedal crank. A pedal lever, which includes a pedal at one end, is connected to the pedal crank of the first sprocket. The pedal lever is connected to the driving crank of the second sprocket by means of a link. All points of connection are rotatable so that when the drive mechanism is put into operation, the driving crank, pedal crank, pedal lever and link move in various directions with respect to one another. This drive mechanism is further complicated by providing means to vary the power stroke, even while riding, by moving the pedal relative to the driving crank on the second sprocket.

Further, a bicycle pedal drive mechanism intended to increase torque is disclosed in U.S. Pat. No. 4,872,695 to Silvano et al. The pedal crank of a conventional drive mechanism is extended, at the end of which an elongate bar is pivotally connected thereto. The elongate bar has an elongate back end which extends rearwardly to a point adjacent to the axis of the rear wheel of the bicycle, where it is slideably disposed in a sleeve. The elongate bar also includes a front end which is disposed at an obtuse angle to the back end of the elongate bar, and includes a pedal at the end thereof. It is the link of the front end which provides the increase in transmitted torque. The angle of the front of the elongate bar is provided to prevent the pedal from striking the ground when the pedal is at the bottom portion of the power stroke. The back end of the elongate bar, and slideable disposition thereof, is provided simply because the front end must be pivotally attached to the crank, and without the back end of the elongate bar, the front end would always be in the vertical position. If the crank were simply extended, the same torque advantage might be realized, but the entire drive mechanism and the seat of the bicycle would have to be raised further above the surface of the ground to prevent pedals from striking the ground before beginning the return stroke.

The Lienhard and Silvano et al patents do not, however, adequately address the above described shortcomings, nor do they provide all of the desirable features of an improved drive mechanism. Those in the art will recognize that Lienhard undesirably provides a complicated linkage as well as an additional drive sprocket to provide a pedal path in which the return stroke is only modestly shorter than the power stroke. Silvano et al does not address the disadvantage of having dead spots in the pedal path, nor in providing a power stroke which is adequately or substantially longer than the return stroke in order to increase the efficiency thereof. Further, Silvano et al employs an elongate bar which is in reciprocating sliding relationship with a support at the rear of the bicycle. The movement of the elongate bar is not desirable for safety reasons, and the sliding relationship is undesirable for maintenance purposes.

It is apparent from the foregoing that a simply structured drive mechanism which alleviates the inefficiencies associated with conventional drive mechanisms is warranted. The present invention thus addresses the above and other shortcomings which heretofore were lacking with respect to drive mechanisms for bicycles and other vehicles or other devices

SUMMARY AND OBJECTS OF THE INVENTION

Thus, the present invention relates to a drive mechanism having a rotatable drive wheel, a lever arm rotatably connected to the drive wheel at a point between the first end and second end of the lever arm, whereby the connection point is moveable in a substantially circular path about the axis of the drive wheel, and guide means connected to the lever arm for supporting the second end of the lever arm and limiting the movement of the lever arm, whereby a force exerted against the first end of the lever arm causes the first end to move through an arcuate path with respect to the axis of the drive wheel, and after completing the arcuate path, the first end moves through a return path to reposition the first end at the beginning of the arcuate path, the return path being closer to the axis of the drive wheel than the arcuate path.

Accordingly, it is an object of the present invention to provide a drive mechanism for a bicycle, exercise bicycle or other vehicle or device which substantially minimizes or eliminates the "dead spots" associated with conventional drive mechanisms.

It is another object of the present invention to provide a simply structured drive mechanism which provides a more efficient transmission of force than conventional drive mechanisms.

It is another object of the present invention to provide a drive mechanism which alters the conventional circular pedal path to provide a more efficient pedal path.

It is yet another object of the present invention to provide a drive mechanism which can be retrofit on a bicycle or other vehicle or device by simple modification of the conventional drive mechanism thereon.

It is yet another object of the present invention to provide a drive mechanism having an elongate lever arm from the axis of the drive wheel to the pedal to thereby increase the torque applied to the drive mechanism.

It is yet another object of the present invention to provide a drive mechanism which can be adjusted to alter the pedal path or to vary the torque which can be applied to the pedals.

It is yet another object of the present invention to provide a bicycle having a drive mechanism which facilitates a more efficient transmission of force and increases the torque resulting from force applied to the pedals, while providing sufficient ground clearance for the pedals.

It is yet another object of the present invention to provide a bicycle having a drive mechanism in which the pedals move in a substantially D-shaped or elliptically shaped path, whereby the work stroke is longer than the return stroke.

It is yet another object of the present invention to provide a bicycle having a drive mechanism which emulates a 50/50 pedal motion.

It is yet another object of the present invention to provide a manual drive mechanism which can be arranged substantially in front of the operator, as in a vehicle where the operator's legs extend forwardly, or substantially below the operator, as in a conventional bicycle.

DESCRIPTION OF THE DRAWINGS

The foregoing and other objects of the present invention will become apparent, as will a better understanding of the concepts underlying the present invention, by reference to the description which follows and refers to the accompanying drawings in which.

DESCRIPTION OF THE DETAILED EMBODIMENT

Referring to the drawings, FIGS. 1-5 show a bicycle generally designated as 10 which includes a preferred embodiment of a drive mechanism generally designated as 20 in accordance with the present invention.

Figure 1:
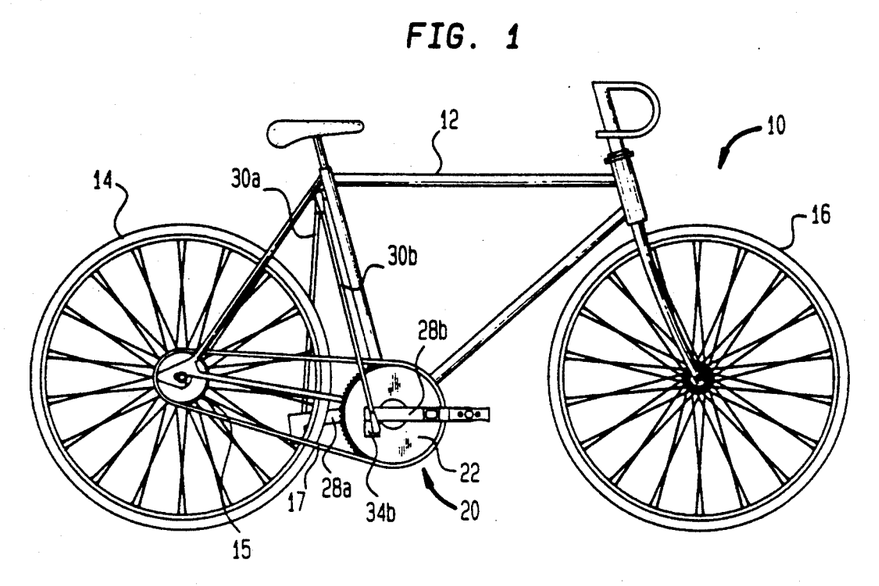
FIG. 1 is a right side view of a bicycle embodying a drive mechanism in accordance with the present invention.
Figure 2:
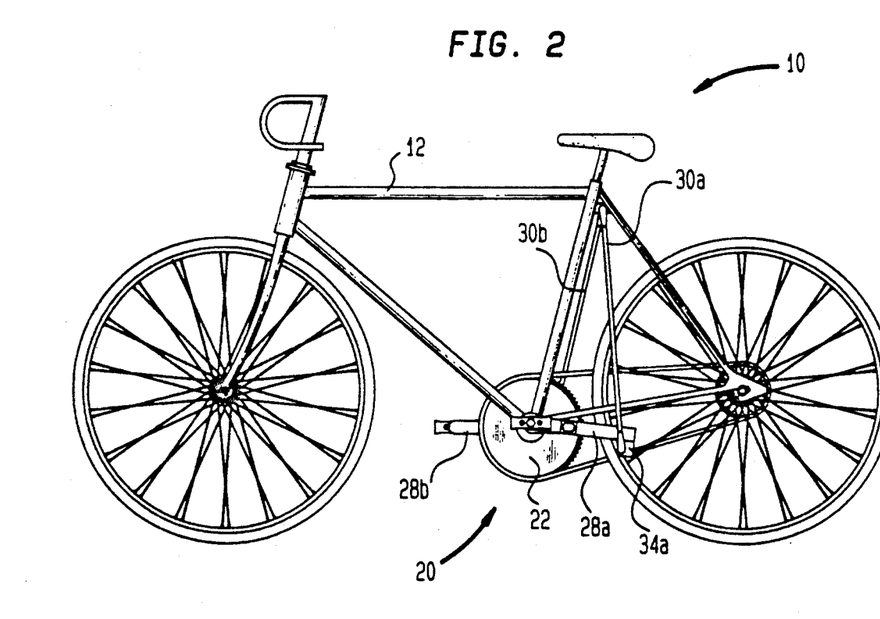
FIG. 2 is a left side view of the bicycle shown in FIG. 1.

Bicycle 10 includes a frame 12 which carries the wheels 14 and 16, the seat and handlebars, as well as the drive system or mechanism 20. The rear wheel 14 includes a gear 15 which is adapted to be operatively associated with the drive chain 17, which, in turn, is operatively associated with the drive mechanism 20 to facilitate the transmission of force to the gear 15 It is reiterated that although the drive mechanism 20 is shown in connection with a bicycle, its benefits can be realized in connection with stationary exercise bicycles or other vehicles or devices requiring the transmission of force, whether such force is manual or otherwise generated.

Figure 3A:
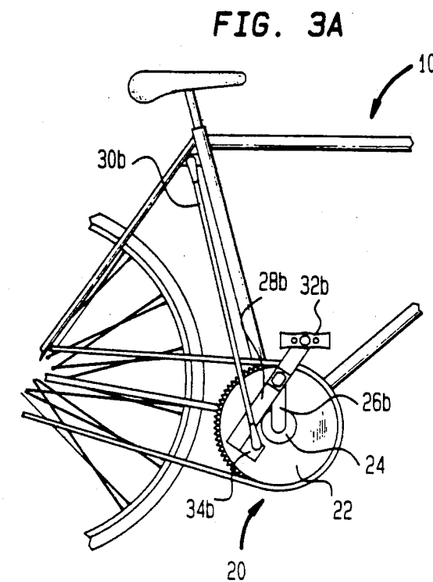
FIGS. 3A-3D are enlarged partial side views of the bicycle shown in FIG. 1, illustrating in particular the drive mechanism in different positions throughout the pedal path, FIG. 3B showing the pedal path in phantom.
Figure 3B:
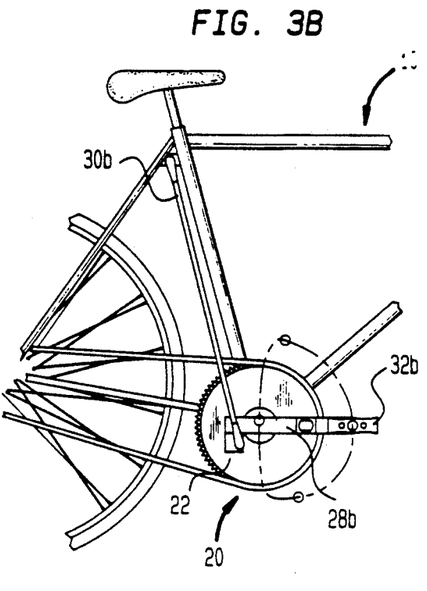
Figure 3C:
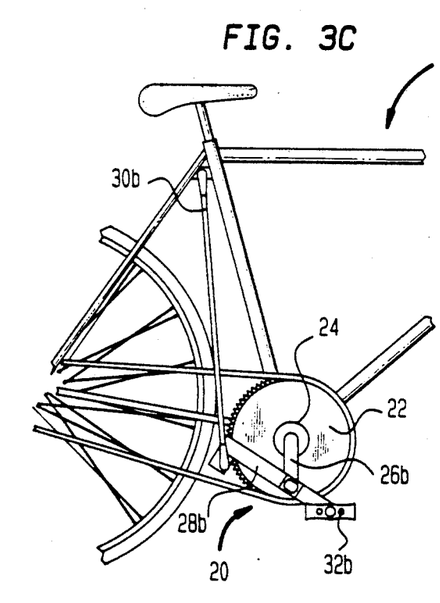

Drive mechanism 20 includes a drive wheel 22 which is rotatably connected to the frame 12 at the bushing 24 (most clearly shown in FIGS. 3C and 3A). The drive sprocket 22 includes transmission means in the form of sprocket teeth to facilitate the transmission of force via the drive chain 17 when the drive sprocket 22 is rotated about the bushing 24. The drive sprocket 22 further includes pedal cranks 26a and 26b, as most clearly shown in FIG. 5. The pedal cranks 26a and 26b are fixed on either side of the drive sprocket 22 in the area of the bushing 24 at the axis 22a of the drive sprocket 22, and extend in diametrically opposite directions. The bushing 24 thus enables the cranks 26 to rotate, thereby rotating the drive sprocket.

It is noted that the cranks 26 in the preferred embodiment of the present invention are similar to conventional cranks on conventional pedal drive mechanisms for bicycles, differing only in that the cranks 26 are shorter than such conventional cranks. Specifically, conventional cranks have lengths in the range of 6½ to 8 inches, while the cranks 26 in accordance with the preferred embodiment of the present invention have lengths in the range of 3½–4¾ inches. It is specifically noted that although the cranks 26 in the preferred embodiment of the present invention are shorter than conventional cranks, it is possible to practice the present invention with conventional cranks, or even cranks which are longer than conventional cranks. Of course, the dimensions of the bicycle and/or the other components of the drive mechanism, as will be described below, and the desired performance of the drive mechanism, must be considered when fixing the length of the pedal cranks 26.

For instance, a limitation on the length of the pedal cranks 26 may be the amount of overlap the front sections of the lever arms 28 may have with the front wheel 16. Such an overlap could cause interference with the front tire when turning. However, such overlap might be acceptable in racing bikes since sharp turns are rarely made during races and therefore there would be no such interference.

Rotatably connected to the end of the pedal cranks 26a and 26b are lever arms 28a and 28b. The respective lever arms 28 are supported by guide members 30a and 30b, both of which are rotatably connected to the rear sections of the respective lever arms 28a and 28b. The guide members 30 are rigid, and extend upwardly where they are pivotally attached to the frame 12 just below the seat of the bicycle 10, or more accurately, between the rear tire and the bottom of the seat The respective lever arms 28a and 28b carry at their front sections pedals 32a and 32b. In operation, the guide members 30 limit the movement of the respective lever arms 28, and thereby defines, at least to some extent, the path of movement travelled by the pedals 32, as discussed further below and shown in FIG. 3.

It is noted that in the preferred embodiment, the rear sections of the respective lever arms 28 (to which the guide members are connected) are longer than the front sections of the lever arms 28 (to which the pedals 32 are connected). Although the respective lengths of the rear sections and front sections are variable for specific applications or to provide desired results, their length will depend upon the size of the bicycle frame and tires, or other dimensions of whatever vehicle or device with which the drive mechanism is associated. Of course, the respective lengths will also depend upon the dimensions of the other components of the drive mechanism 20, such as the length of the guide members 30 and/or the cranks 26. It is noted that the length of the front sections of the respective lever arms, i.e., the distance between the ends of the pedal cranks 26 and the pedals 32, provides, inter alia, increased torque when a force is applied to the pedals 32. Thus, the desired torque, as balanced with the resultant pedal path, and perhaps ground clearance, must also be considered in determining the length of the front section of the respective lever arms 28, as well as the other components of the drive mechanism 20.

The respective lever arms 28a and 28b further include downwardly depending flanges 34a and 34b. The guide members 30a and 30b are, at least in the preferred embodiment, pivotally connected to the respective flanges 34a and 34b. In the preferred embodiment only, this point of connection between the flanges 34 and guide members 30 always remains below the axis 22a of the drive sprocket 22. This is accomplished by providing specific predetermined lengths for the lever arm, or more specifically the rear section of the lever arms; the length of the flanges 34, or more specifically the point of connection of the guide members 30 to the flanges 34; and the lengths of the guide members 30. Of course, all of these lengths, or any other dimension of the bicycle 10 or drive mechanism 20, can be varied to retain the feature of lower pivot points of each of the guide members 30 to be below the axis of the drive sprocket 22 throughout the operation of the drive mechanism 20.

In operation, the guide members 30 are arranged to swing in a pendulum-like path as the drive sprocket 22 is forcibly rotated by the force applied to the pedals 26. Arranging the guide members 30 and the lever arms 28 so that the lower pivot points of the guide members 30 remain below the axis of the drive sprocket 22 causes the guide members to swing in a different pendulum-like path during operation than the path which would be followed if the lower pivot points of the guide members 30 were connected in the same plane as the lever arms 28 themselves. In other words, the flanges 34 provide for a lever action not provided for if the lower end of the guide members 30 were simply connected to the rear section of the lever arms 28.

In the preferred embodiment, the pedal cranks 26 are approximately 3½–4¾ inches in length; the lever arms 28 are approximately 9–12 inches in length; the rear sections of the lever arms 28 are approximately 6–7½ inches in length; the front sections of the lever arms 28 are approximately 3–5 inches in length; the flanges 34 are arranged between 1½–2¼ inches below the axis 22a of the drive sprocket; and the guide members 30 are approximately 15–19 inches in length. Of course, the invention is not limited to these dimensions which represent those currently available based on limited analytical analysis and experimentation.

As mentioned above, the guide members 30 can vary in length. This will depend not only on the dimensions of the other components of the drive mechanism 20, but also on where the guide members 30 are pivotally connected to the bicycle frame at their upper ends. In the preferred embodiment illustrated in the drawings, the guide members are directed upwardly and are pivotally connected to the frame between the rear tire and the bottom of the seat of the bicycle 10. It is possible, however, to pivotally connect the upper ends of the guide members 30 at positions further behind the seat or even in front of the seat. As shown, the guide members 30 extend in a substantially vertical direction, only varying 15° or so from a 90° angle with a horizontal plane through the axis of the drive sprocket 22. The spirit and scope of the present invention can still be practiced with the guide members 30 extending upwardly in a range between 45° and 135°, as measured from the horizontal plane through the axis of the drive sprocket 22 and starting from the rear of the bicycle 10. Indeed, an equally desirable pedal path might be obtained by moving the guide members 30 towards the rear of the bicycle 10 (and varying the length thereof), such that the guide members 30 are at approximately 60° from the horizontal starting from the rear of the bicycle 10. In such case, the guide members 30 would be pivotally connected to that portion of the frame which extends from the seat downwardly towards the axis of the rear wheel 14.

It is also noted that the guide members 30 need not be pivotally connected to the bicycle frame 12 or the lever arms 28. Instead, cylinders or sliders may be provided at either end, though it is believed that cylinders, sliders or other similar devices should only practically be used at the upper pivot point of the guide members 30.

Figure 6:
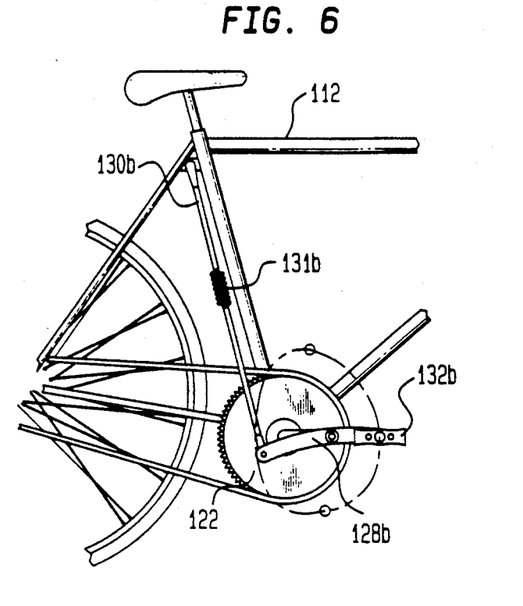
FIG. 6 is an enlarged partial side view of a bicycle embodying a drive mechanism in accordance with another embodiment of the present invention.

It is also contemplated that a compression spring might be associated with the guide members 30. In this regard, FIG. 6 shows an alternate embodiment of the drive mechanism in accordance with the present invention, illustrating guide member 130b connected to frame 112 and lever arm 128b. Guide member 130b includes a compressible spring 131b in the medial area thereof, though it may be placed at other areas of the guide member 130b, or may take a form other than a spring. As the pedal 132b is forced through the work stroke, the compressible spring 131b is loaded by reason of the guide member 130b being attached to the rear section of the lever arm 128b. When the pedal 132b is at the bottom of the work stroke, it may normally be difficult to begin moving the opposite pedal which is at the top of the work stroke. The loading of the spring 131b, however, forces the lower section of the guide member 130b downwardly such that the rear section of the lever arm 128b is forced downwardly. This facilitates not only the return of the pedal 132b, but, more importantly, the rotation of the drive sprocket 122, and thus the opposite pedal receives a "headstart". That is to say, that the spring 131b facilitates the initial downward movement of the opposite pedal which is at the top of the work stroke, despite the weight of the operator on the pedal 132b which is at the bottom of the work stroke.

Figure 7:
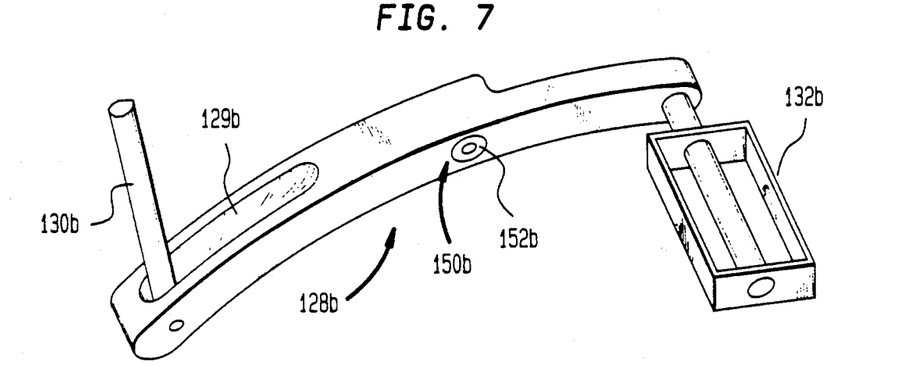
FIG. 7 is an enlarged perspective view of the lever arm of the drive mechanism shown in FIG. 6.
Figure 7A:
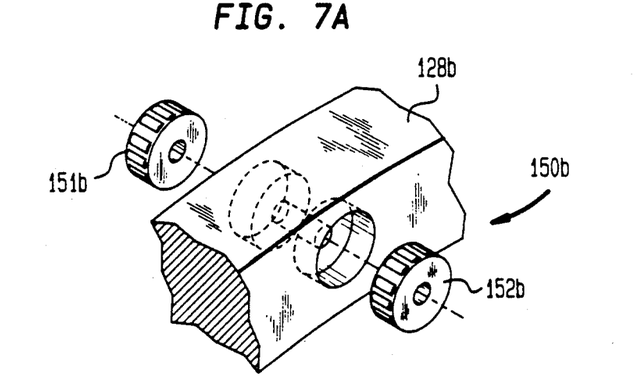
FIG. 7A is an enlarged cross-sectional view of the lever arm bushing of the drive mechanism in accordance with the present invention.

The embodiment in FIG. 6 also shows an alternate lever arm 128b which has, in side view, a generally, albeit modest, arcuate shape. Thus, the pivotal connection of the guide member 130b remains, preferably, at a point below the axis of the drive sprocket 122, without the need for a flange extending normal to the remaining portions of the lever arm. FIG. 7 shows a perspective view of the lever arm 128b and FIG. 7A shows an enlarged cross-sectional view of the lever arm bushing, generally designated as 150b in accordance with the present invention. The lever arm 128b is partially slotted at the rear section thereof, the slot 129b extending through the lever arm 128b at the very rear end thereof (that is, at the point of pivotal connection to the guide member 130b). In addition, the front section of the lever arm 128b, that is, forward of the lever arm bushing, is of decreased width. Both of these measures decrease the weight of the lever arm 128b. With respect to the lever arm 150b, two ball bearing or roller bearing bushings 151b and 152b are provided for disposition in their respective bushing seats, as shown in FIG. 7A. These bushing seats are on either side of the lever arm 128b and a hole is provided to receive the pintle or axle of the drive sprocket. The bushing seats are formed by drilling a counterbore on either side of the lever arm. This bushing arrangement has been found to be quite adequate for handling the potentially high torques developed during the operation of the drive mechanism in accordance with the present invention.

In operation, the pedal cranks 26 move in a crank circle about the axis 22a of the drive sprocket 22 or the bushing 24 which houses the same. As force is applied to either of the pedals 32, the respective pedal crank 26 and the respective front section of the respective lever arm 28 act coextensively to rotate the drive sprocket 22. This is facilitated by the manner in which the guide members 30 limit the movement of the lever arms 28. As can be seen in FIG. 3A, the pedal crank 26b is in a substantially vertical position, such that in a conventional pedal drive mechanism, the conventional pedal would be in substantially a "dead spot". With the positioning of lever arm 28b, however, the pedal 32b is substantially at the beginning of the work stroke, where, together the front section of the lever arm 28b and the crank 26b, a force applied thereagainst will manifestly provide sufficient leverage in order to rotate the drive sprocket 22.

FIG. 3B illustrates in phantom the path of the pedal 32b, as it would be with the given lengths and dimensions of the components which make up the drive mechanism 20 illustrated in the preferred embodiment. It can be seen that the pedal path in accordance with the present invention is a substantially D-shaped path, whereby the work stroke is substantially arcuate with respect to the axis of the drive sprocket 22, yet the return path is substantially vertical returning the pedals 32 through the middle of the drive sprocket 22. This return stroke is considerably shorter than the work stroke or the return path in conventional pedal systems, and provides for the quicker return of the pedals 32. The resulting pedal path is thus more efficient than conventional pedal paths.

Figure 3D:
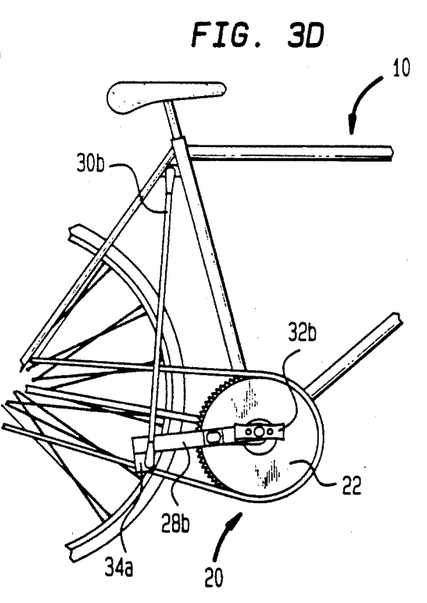
Figure 4:
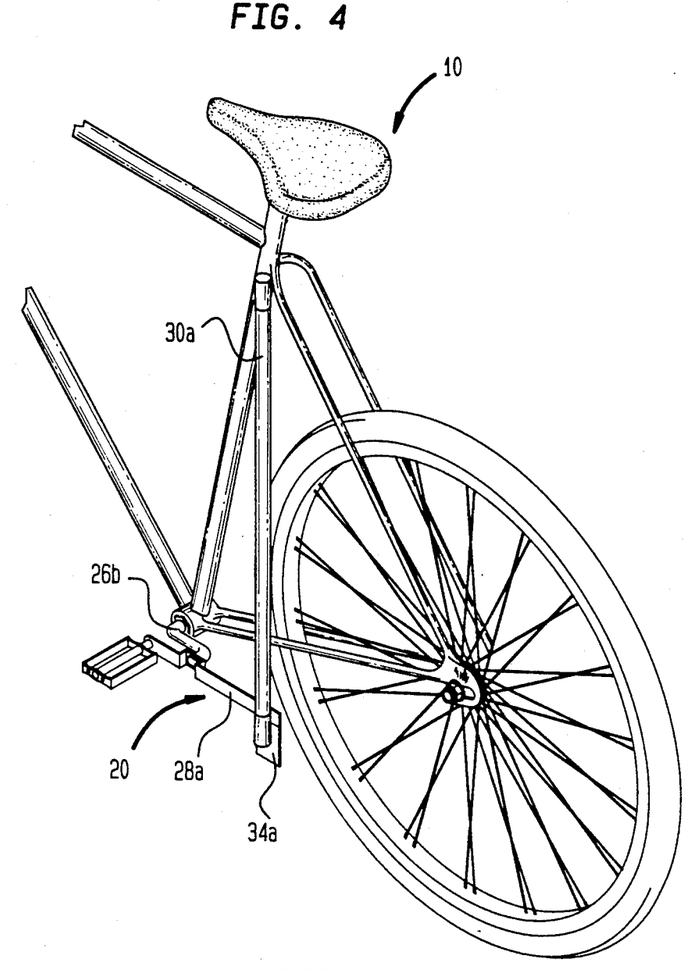
FIG. 4 is a rear perspective view of the bicycle and drive mechanism shown in FIG. 1.
Figure 5:
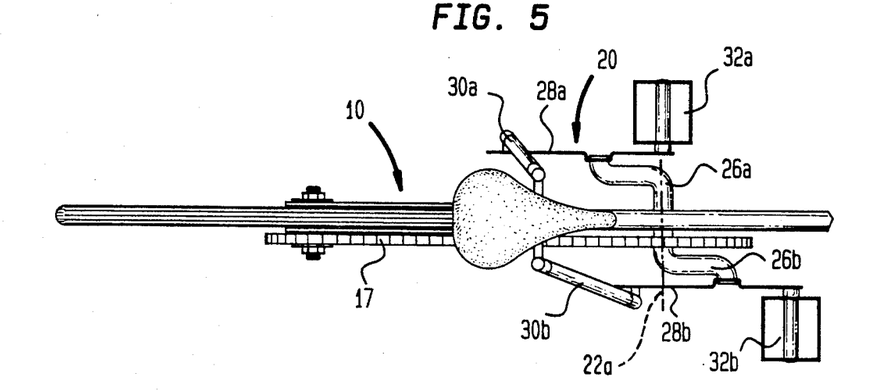
FIG. 5 is a top view of the bicycle and drive mechanism in FIG. 1.

As shown in FIG. 3B, the pedal 32b is in approximately the middle of the work stroke. As force is continuously applied on the pedal 32b, the pedal 32b moves towards the bottom of the work stroke, as shown in FIG. 3C. In the pedal positions shown in FIGS. 3B and 3C, and even 3A, the pedal 32b is said to be in the "extended" position. The extended position occurs when the pedal 32b is outside of the forward circular arc of the crank circle defined by the point of attachment of the crank 26b to the lever arm 28b. As shown in FIG. 3D, the pedal 32b is in what is referred to as the "folded" position—that is, inside the forward portion of the crank circle.

The structure and operation of the present invention as described above results in a "50/50" pedal motion—that is, when one pedal is at the bottom of the work stroke, the other pedal is at the beginning of the work stroke, or more specifically, in front of the axis 22a of the drive sprocket 22. This can be better understood by referring to FIGS. 3C and 3A. In FIG. 3C, the crank 26b is shown in the downward vertical position, and thus the pedal 32b is approaching the end of the work stroke. The crank 26a, though not shown in FIG. 3C, would be diametrically opposite to the crank 26b, or in the same position as the crank 26b as shown in FIG. 3A, whereat the pedal 32a would be approaching or at the beginning of the work stroke. Such 50/50 pedal motion is highly efficient insofar as the transmission of force is concerned. Moreover, there is an increase in acceleration since there are more work strokes (with either pedal) in the same amount of time. However, as a result, there is very little rest in between pedalling since the return stroke is short.

As can be appreciated, the dimensions of the various components of the drive mechanism in accordance with the present invention will determine the range within which the pedals will operate to transmit the force necessary to move, for instance, a bicycle. That is, the dimensions of such components will define the distance travelled by a pedal from the top of the work stroke to the bottom of the work stroke. Thus, when a pedal crank is $3\frac{1}{2}$ inches in length and the front section of the lever arm is $3\frac{1}{2}$ inches in length, and the rear section of the lever arm is 5 inches in length, the work stroke, or at least the most effective portion thereof, is approximately 11 inches in length. This type of arrangement is considered a "100% fold"—that is, where the pedal returns through the center of the drive sprocket. This is because the pedal crank and the front section of the lever arm are equal to one another at $3\frac{1}{2}$ inches in length.

In preferred arrangement, when the pedal crank is 4 inches in length and the front section of the lever arm is $3\frac{1}{4}$ inches in length, and the rear section of the lever arm is $6\frac{1}{4}$ inches in length, the effective length of the crank is 8 inches ($3\frac{1}{4} + 4\frac{3}{4}$), rather than 7 inches ($3\frac{1}{2} + 3\frac{1}{2}$) as in the previous example. Thus, the approximate vertical distance of the work stroke, or at least the most effective portion thereof, for the pedal is $13\frac{1}{2}$ inches. In this arrangement, the pedal folds behind the axis of the drive sprocket, and a more oval or elliptical pedal path is defined. Such an elliptical pedal path is shown in FIG. 6 which employs a lever arm and pedal crank of the dimensions described in the latter arrangement. As can be appreciated, the elliptical path provides for a smoother transition from the return stroke to the work stroke, than does the D-shaped path.

While the foregoing description and figures are directed to the preferred embodiment of the drive mechanism in accordance with the present invention, it should be appreciated that certain modifications can be made, and are indeed encouraged to be made, in the materials, structure and arrangement of the disclosed embodiment without departing from the spirit and scope of the present invention which is intended to be captured by the claims set forth below.

What is claimed is:

1. A drive mechanism comprising:
   (a) a rotatable drive wheel, said drive wheel having an axis;
   (b) a lever arm having a first end and a second end, said lever arm being rotatably connected to said drive wheel at a medial connection point between said first end and said second end, said medial connection point being moveable in a substantially circular path about said axis of said drive wheel;
   (c) a guide rod rotatably connected to said lever arm for supporting said second end and limiting the movement of said lever arm, said guide rod and said lever arm being constructed and arranged with respect to one another such that when a force is exerted against said first end, said first end moves through an arcuate path with respect to said axis to thereby rotate said drive wheel about its axis, and that upon completion of said arcuate path, said first end moves through a return path to position said first end at the beginning of said arcuate path, said arcuate path being longer than said return path, said first end moving closer to said axis during said return path than during said arcuate path;
   (d) a crank connecting said drive wheel and said lever arm, said medial connection point being at the connection of said lever arm to said crank; and
   (e) a pedal rotatably connected at said first end of said lever arm at a first connection point to facilitate the application of force to said first end, and wherein said guide rod is rotatably connected at or adjacent said second end of said lever arm at a second connection point, said second connection point being offset from an imaginary line drawn through said first connection point and said medial connection point.

2. The drive mechanism in claim 1, wherein said lever arm includes a flange depending from said second end, and said guide rod is rotatably connected to said flange.

3. The drive mechanism in claim 1, wherein said connection point is closer to said first end than said second end.

4. The drive mechanism in claim 1, wherein said guide rod is disposed at an angle to said lever arm.

5. The drive mechanism in claim 4, wherein said guide rod extends in a substantially upward direction throughout the rotation of said drive wheel.

6. The drive mechanism in claim 4, wherein said lever arm and said guide rod are provided on a first side of said drive wheel, and further including a second lever arm, a second guide rod, a second crank and a second pedal of substantially similar construction to said lever arm, said guide rod, said crank and said pedal and being arranged in a substantially similar manner on a second side of said drive wheel.

7. The drive mechanism in claim 6, wherein said second lever arm is rotatably connected to said drive wheel on said second side of said drive wheel at substantially 180° from the rotatable connection of said lever arm to said drive wheel on said first side of said drive wheel.

8. The drive mechanism in claim 5, wherein said drive wheel includes transmission means to facilitate the transmission of the force exerted on said first end of said lever arm.

9. The drive mechanism in claim 8, wherein said transmission means are sprockets adapted to be operatively associated with a drive chain.

10. The drive mechanism in claim 9, wherein said guide rods and said lever arms are so constructed and arranged that said second end of said lever arm at the connection to said guide rod is below the axis of said drive wheel throughout the rotation of said drive wheel.

11. The drive mechanism in claim 6, wherein said cranks, guide means and lever arm are constructed and arranged so that said pedals move in a substantially D-shaped pedal path when said drive mechanism is operated.

12. The drive mechanism in claim 6, wherein said cranks, guide means and lever arm are constructed and arranged that said pedals move in a substantially elliptical peal path when said drive mechanism is operated.

13. The drive mechanism in claim 1, for use with a bicycle having a frame, at least one wheel connected to said frame and a seat mounted on said frame at a location above said at least one wheel, wherein said axis of said drive wheel is connected to said frame, and said guide rod is a rigid elongate member extending in a substantially upward direction and having a first end pivotally connected to said lever arm and a second end pivotally connected to said frame at a location above said at least one wheel and below said seat.

14. The drive mechanism in claim 13, wherein said lever arm includes a flange depending from said second end, and said elongate rigid member is pivotally connected to said flange.

15. The drive mechanism in claim 14, wherein said elongate rigid member and said lever arm are so constructed and arranged that said first end of said elongate rigid member is always below said axis of said drive wheel.

16. The drive mechanism in claim 15, wherein said lever arm includes a pedal at said first end to facilitate the application of force to said first end.

17. The drive mechanism in claim 16, wherein said drive wheel includes a crank, and said lever arm is rotatably connected to said crank.

18. The drive mechanism in claim 17, wherein said crank is between approximately two and six inches in length, said lever arm is between approximately 9 and 12 inches in length, said crank is connected to said lever arm between approximately 6 and 7½ inches from said rigid member, and said rigid member is between approximately 15 and 19 inches in length.

19. The drive mechanism in claim 13, wherein said elongate rigid member is disposed at an angle to said lever arm.

20. The drive mechanism in claim 19, wherein said elongate rigid member end is connected to said frame above said lever arm so that said elongate rigid member extends in a substantially upward direction.

21. The drive mechanism in claim 1, wherein said guide rod is longer than said lever arm.

22. A bicycle comprising:
(a) a frame, a front and rear wheel connected to said frame, and a seat mounted on said frame at a location above said rear wheel;
(b) a drive wheel rotatably connected to said frame at its axis;
(c) a lever arm having a first end and a second end, said lever arm being rotatably connected to said drive wheel at a medial connection point between said first end and said second end, said medial connection point being moveable in a substantially circular path about said axis of said drive wheel;
(d) a guide rod for supporting said second end of said lever arm and limiting the movement of said lever arm, said guide rod having a first end and a second end, said second end of said guide rod being rotatably connected to said lever arm, and said first end of said guide rod being connected to said frame such that said guide rod is at an angle to said lever arm throughout the rotation of said drive wheel, said guide rod and said lever arm being constructed and arranged with respect to one another such that when a force is exerted against said first end, said first end moves through an arcuate path with respect to said axis to thereby rotate said drive wheel about its axis, and that upon completion of said arcuate path, said first end moves through a return path to position said first end at the beginning of said arcuate path, said arcuate path being longer than said return path, said first end moving closer to said axis during said return path than during said arcuate path;
(e) a crank connecting said drive wheel and said lever arm, said medial connection point being at the connection of said lever arm to said crank; and
(f) a pedal rotatably connected at said first end of said lever arm at a first connection point to facilitate the application of force to said first end, and wherein said guide rod is rotatably connected at or adjacent said second end of said lever arm at a second connection point, said second connection point being offset from an imaginary line drawn through said first connection point and said medial connection point.

23. The bicycle in claim 22, wherein said first end of said guide rod is connected to said frame at a location point above the rear wheel and below the seat.

24. The drive mechanism in claim 22, wherein said drive wheel includes a crank, and said lever arm is rotatably medial connected to said crank at said connection 25. The drive mechanism in claim 24, wherein said lever arm includes a flange depending from said second end, and said guide means is rotatably connected to said flange.

26. A bicycle comprising:
(a) a frame, a front and rear wheel connected to said frame, and a seat mounted on said frame at a location above said rear wheel;
(b) a drive wheel rotatably connected to said frame at its axis;
(c) a lever arm having a first end and a second end, said lever arm being rotatably connected to said drive wheel at a medial connection point between said first end and said second end, said medial connection point being moveable in a substantially circular path about said axis of said drive wheel; and
(d) a guide rod for supporting said second end of said lever arm and limiting the movement of said lever arm, said guide rod having a first end and a second end, said second end of said guide rod being rotatably connected to said lever arm, and said first end of said guide rod being connected to said frame such that said guide rod is at an angle to said lever arm through out the rotation of said drive wheel, said guide rod and said lever arm being constructed and arranged with respect to one another such that when a force is exerted against said first end, said first end moves through an arcuate path with respect to said axis to thereby rotate said drive wheel at its axis, and that upon completion of said arcuate path, said first end moves through a return path to position said first end at the beginning of said arcuate path, said arcuate path being longer than said return path, said first end moving closer to said axis during said return path than during said arcuate path; and
(e) a crank connecting said lever arm and drive wheel, wherein said lever arm is rotatably connected to said crank at a point which is closer to said first end than to said second end, and wherein said guide rod is a rigid elongate bar pivotally connected to said second end of said lever arm, and wherein said rigid elongate bar and said lever arm are so constructed and arranged that said second end of said lever arm is below said axis of said drive wheel throughout the rotation of said drive wheel.

27. The bicycle in claim 26, wherein said first end of said guide rod is connected to said frame at a location point above the rear wheel and below the seat.

28. A drive mechanism comprising:
(a) a rotatable drive wheel, said drive wheel having an axis;
(b) a lever arm having a first end and a second end, said lever arm being rotatably connected to said drive wheel at a medial connection point between said first end and said second end, said medial connection point being moveable in a substantially circular path about said axis of said drive wheel; and
(c) a guide rod rotatably connected to said lever arm for supporting said second end and limiting the movement of said lever arm, said guide rod and said lever arm being constructed and arranged with respect to one another such that when a force is exerted against said first end, said first end moves through an arcuate path with respect to said axis to thereby rotate said drive wheel about its axis, and that upon completion of said arcuate path, said first end moves through a return path to position said first end at the beginning of said arcuate path, said arcuate path being longer than said return path, said first end moving closer to said axis during said return path than during said arcuate path, wherein said guide rod and said lever arm are so constructed and arranged that said second end of said lever arm at the connection to said guide rod is below said axis of said drive wheel throughout the rotation of said drive wheel.

29. The drive mechanism in claim 28, wherein said guide rod is longer than said lever arm.

30. A bicycle comprising:
(a) a frame, a front and rear wheel connected to said frame, and a seat mounted on said frame at a location above said rear wheel;
(b) a drive wheel rotatably connected to said frame at its axis;
(c) a lever arm having a first end and a second end, said lever arm being rotatable connected to said drive wheel at a medial connection point between said first end and said second end, said medial connection point being moveable in a substantially circular path about said axis of said drive wheel, said lever arm having an arcuate shape; and
(d) a guide rod for supporting said second end of said lever arm and limiting the movement of said lever arm, said guide rod having a first end and a second end, said second end of said guide rod being rotatably connected to said lever arm, and said first end of said guide rod being connected to said frame such that said guide rod is at an angle to said lever arm through out the rotation of said drive wheel, said guide rod and said lever arm being constructed and arranged with respect to one another such that when a force is exerted against said first end, said first end moves through an arcuate path with respect to said axis to thereby rotate said drive wheel about its axis, and that upon completion of said arcuate path, said first end moves through a return path to position said first end at the beginning of said arcuate path, said arcuate path being longer than said return path, said first end moving closer to said axis during said return path than during said arcuate path.

31. The bicycle in claim 30, wherein said first end of said guide rod is connected to said frame at a location point above the rear wheel and below the seat.

32. A drive mechanism comprising:
(a) a rotatable drive wheel, said drive wheel having an axis;
(b) a lever arm having a first end and a second end, said lever arm being rotatably connected to said drive wheel at a medial connection point between said first end and said second end, said medial connection point being moveable in a substantially circular path about said axis of said drive wheel, said lever arm having an arcuate shape; and
(c) a guide rod rotatably connected to said lever arm for supporting said second end and limiting the movement of said lever arm, said guide rod and said lever arm being constructed and arranged with respect to one another such that when a force is exerted against said first end, said first end moves through an arcuate path with respect to said axis to thereby rotate said drive wheel about its axis, and that upon completion of said arcuate path, said first end moves through a return path to position said first end at the beginning of said arcuate path, said arcuate path being longer than said return path, said first end moving closer to said axis during said return path than during said arcuate path.

33. The drive mechanism in claim 32, wherein said guide rod is longer than said lever arm.

* * * * *

UNITED STATES PATENT AND TRADEMARK OFFICE
CERTIFICATE OF CORRECTION

PATENT NO. : 5,172,926

DATED : December 22, 1992

INVENTOR(S) : Mannino

It is certified that error appears in the above-identified patent and that said Letters Patent is hereby corrected as shown below:

```
Column 4, line 29, between "15" and "It", insert --.--.
Column 8, line 61, "4" should read --4¾--.
Column 10, line 11, "5" should read --6--.
Column 10, line 33, "peal" should read --pedal--.
Column 11, line 2, delete "end".
Column 11, line 57, delete "medial".
Column 11, line 57, between "said" and "connec-", insert --medial--.
Column 13, line 12, "rotatable" should read --rotatably--.
Column 13, line 25, "through out" should read --throughout--.
```

Signed and Sealed this

Sixteenth Day of November, 1993

Attest:

BRUCE LEHMAN

*Attesting Officer*  *Commissioner of Patents and Trademarks*